Sept. 2, 1958 G. T. ROYDEN 2,850,095

APPARATUS AND METHOD FOR MAKING SERIAL NUMBER TAPE

Filed Dec. 15, 1955 2 Sheets-Sheet 1

INVENTOR.
G. T. ROYDEN
BY
AGENT

APPARATUS AND METHOD FOR MAKING SERIAL NUMBER TAPE

Filed Dec. 15, 1955 2 Sheets-Sheet 2

INVENTOR.
G. T. ROYDEN
BY
[signature]
AGENT 2,850,095
Patented Sept. 2, 1958

2,850,095

APPARATUS AND METHOD FOR MAKING SERIAL NUMBER TAPE

George Taylor Royden, South Orange, N. J., assignor to Mackay Radio and Telegraph Company, New York, N. Y., a corporation of Delaware Application December 15, 1955, Serial No. 553,389

9 Claims. (Cl. 164—115)

My invention relates to an apparatus for and method of producing number tapes for use in telegraph offices.

In some telegraph offices it is customary to employ a number of multiple transmitter distributor sets, which when used with reperforators provide combined sending and receiving facilities for tape message relaying. These sets usually comprise two automatic tape message transmitter distributors and a number transmitter distributor. The function of the number of transmitter distributor is to insert automatically into the signal line from a number tape, successive numbers as well as a circuit code designation, which will identify each message before the address and text are transmitted. The number transmitter distributor is like the message transmitter distributors except that it is equipped with a letter sensing mechanism which makes it responsive to the letters shift combination in the number tape to cause the stopping of the number transmitter distributor and starting of a message transmitter distributor through suitable control of circuits.

A large telegraph office of this type handles numerous circuits and a very substantial quantity of number tapes is in continuous use. Since a different number tape has to be provided for each circuit and the tapes wear out rapidly, the punching of the tapes by hand is a laborious and expensive procedure.

It is an object of my invention to provide an apparatus for and method of producing such number tapes by automatic means.

According to my invention, to prepare the serial number tape there are provided two automatic tape transmitter distributors and a reperforator associated with a control circuit for alternately stopping and starting the transmitter distributors, under the control of a round or endless tape which is placed in one of the transmitter distributors and an auxiliary tape which is placed in the other transmitter distributor. The round tape is perforated with identical repeated groups of code perforations, each group comprising at least a circuit designation code preceding a figure shift combination, and the auxiliary tape is perforated with repeated groups of code perforations, each group comprising at least a different serial number code followed by a letter shift combination. When the figure-shift combinations on the round tape are sensed in the first transmitter distributor, contacts are actuated to stop the first transmitter distributor and to start the second transmitter distributor, and when the letter shift combinations are sensed in the second transmitter distributor, contacts are actuated to stop the second transmitter distributor and to start the first transmitter distributor. Means is provided in the control circuit for imposing a slight time delay between the stopping of one transmitter distributor and the starting of the next, to permit the completion of the character which is being transmitted.

My invention, both as to its organization and method of operation, will be best understood by reference to the description which follows, taken in conjunction with the accompanying drawings in which.

Figure 2A:
Fig. 2 shows diagrammatically a part of an automatic tape transmitter distributor.
Figure 2:
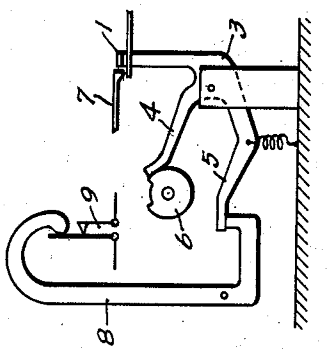
Figure 4C:
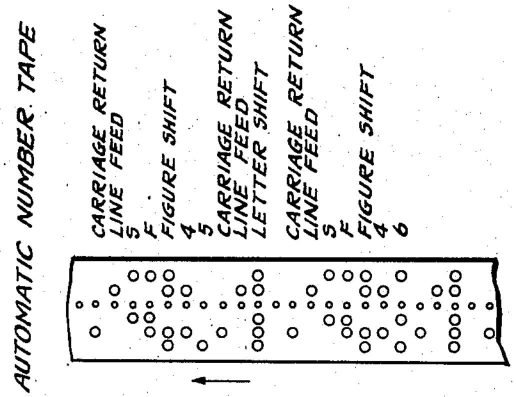
Figure 4B:
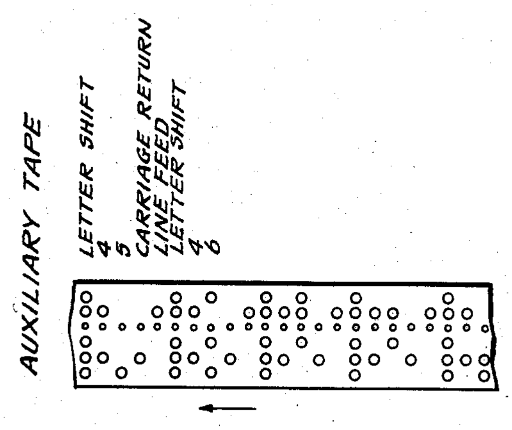
Figure 4A:
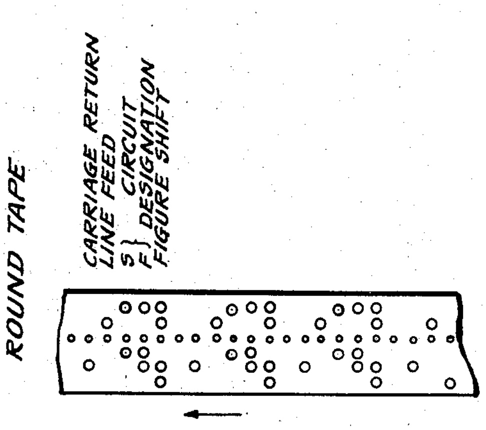
Figure 3:
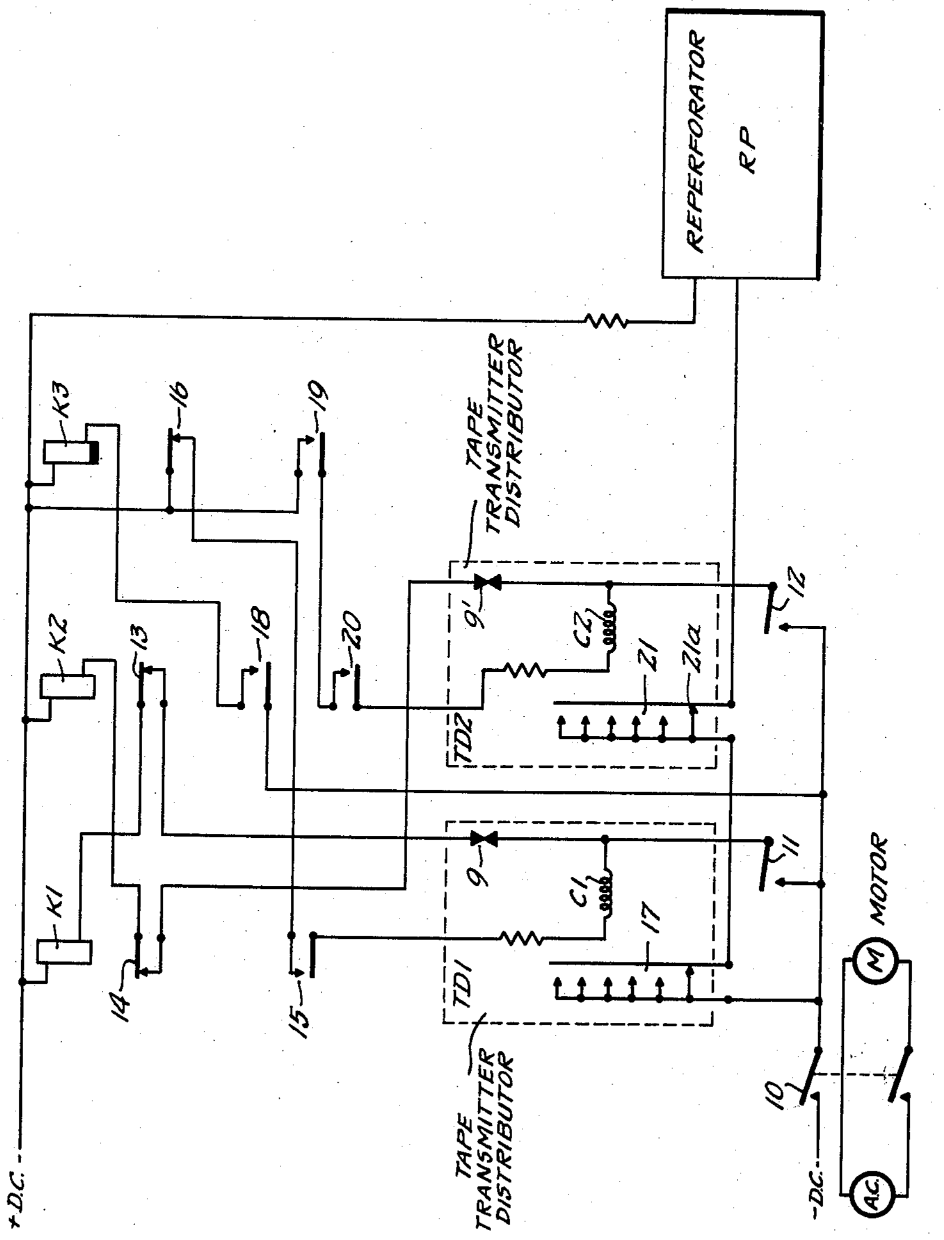

Fig. 2*a* is an enlarged view of an element of the mechanism of Fig. 2;

Fig. 3 is a circuit diagram of a control circuit;

Figs. 4A and 4B show sections of a round tape and an auxiliary tape, respectively, used in practising my invention, and Fig. 4C shows a section of a serial number tape.

Figure 1:
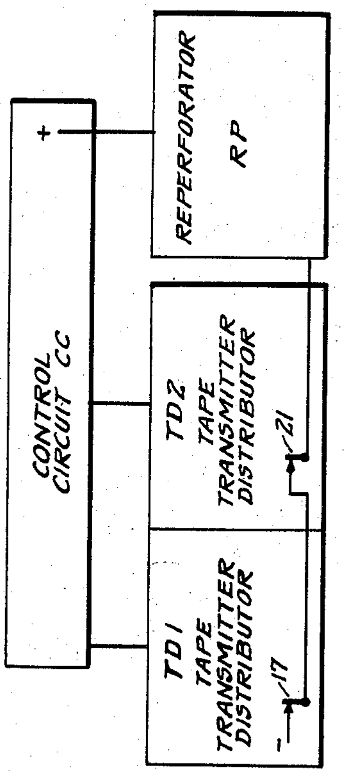
Fig. 1 is a diagram showing in block form the equipment used in practising my invention.

As shown in Fig. 1, the equipment for making the number tape comprises two automatic tape transmitting distributors TD1, TD2, a printing reperforator RP and a control circuit CC. The line signal transmitting contacts of the transmitters TD1 and TD2 are connected in series in the signal input circuit to the reperforator RP.

The transmitter distributor TD1 may comprise a transmitter distributor similar to the number transmitter distributor previously referred to, with the exception that the letter shift operating lever extension 1 is modified by grinding in its edge a notch 2, as shown in Fig. 2*a*. This permits it to sense Figure shift combinations (mark, mark, space, mark, mark) as well as Letter shift combinations (all marks). Referring to Fig. 2, the figures and letters operating lever 3 has two extension arms 4 and 5. The end of the arm 4 rides on a cam 6, and when it is over the cut-away sector thereof, it permits the extension 1 to sense the ends of the five selector levers 7. If the code combination is that for figure or letter shift, the extension 1 is not blocked by any of the selector levers 7 and is, therefore, rotated counterclockwise through a larger angle. The extension arm 5 will thus actuate contact lever 8 which will open the contacts 9. As will be clear from the subsequent description, these contacts are employed in the control circuit.

The transmitter distributor TD2 is similar to TD1 with the exception that, as in a conventional number transmitter distributor, the contacts (9' in Fig. 3) are opened responsive to the sensing, by the lever extension, such as 1, of a letter shift combination only. The printing reperforator RP may be of any known type.

To make an automatic number tape, a round tape containing the desired circuit code designation is first prepared on a typing perforator or by other suitable means. The round tape is shown in Fig. 4A. It is punched with repeated groups of perforations, each group comprising the circuit designation (SF for "San Francisco," for instance) followed by the figure shift combination. The circuit designation may be preceded by a blank, Carriage Return and Line Feed. A sufficient number of repeats is made to make a tape of useable length and the ends gummed together so as to form a loop having precisely the same number and sequence of characters in each group. A different loop must be made for each different circuit. If desired, a short phrase such as Via Mackay Radio may be included in the groups on the round tape.

The auxiliary tape, which is illustrated in Fig. 4B, is perforated with groups of combination, each group beginning with a different serial number (e. g. 45, 46) followed by Carriage Return, Line Feed and Letter Shift. The first group is also preceded by a letter shift combination. This auxiliary serial number tape is kept on hand and used for making all automatic number tapes. It is usually reproduced from a master tape.

The manner of preparing a number tape from the round tape and the auxiliary tape in conjunction with the equipment of Fig. 1 will now be described with reference to Fig. 3.

Switch 10 is first closed, thereby applying A. C. power to the driving motor M which drives the unit, and D. C. power to the control circuits.

A round tape (Fig. 4A) is then placed in the first transmitter distributor TD1 and an auxiliary tape (Fig. 4B) in the second transmitter distributor TD2, a figure shift line of perforations of the round tape being lined up over the sensing pins in the transmitter TD1 and a letters shift line of perforations being lined up over the sensing pins in the transmitter distributor TD2.

The switches 11 and 12 are now closed, switch 11 slightly before 12. Relay K1 is now energized from —battery, closed contacts of switches 10 and 11, normally closed contacts 9 in TD1, back contacts 13 of relay K2, winding of relay K1 to +battery. Relay K1 operates, opens the circuit of relay K2 at contacts 14 and at front contacts 15 closes a circuit for the clutch magnet C1 of transmitter distributor TD1 over a circuit, —battery, switch 11, clutch magnet C1, back contacts 16 of relay K3, +battery.

Th code perforations (Blank, Carriage Return, Line Feed, Circuit Designation Letters, and Figure Shift) on the round tape are now transmitted over the sending contacts 17 of transmitter distributor TD1 to the typing reperforator RP via the normally closed contact 21a as in distributor TD2. When the Figure shift perforations are sensed, the contacts 9, controlled by contact lever 8 (Fig. 2) of transmitter distributor TD1 responsive to the figure shift combination, are opened momentarily and the circuit of relay K1 is broken. Relay K1 releases and opens the circuit for the clutch magnet C1 at contact 15 and the transmitter distributor TD1 is stopped. At the same time, at back contact 14, the following circuit is closed for relay K2 . . . —battery, switch 12, normally closed contacts 9′ responsive to the letter shift combination in transmitter distributor TD2, back contact 14, winding of relay K2, +battery.

A circuit is also closed over contacts 18 of relay K2 for relay K3, which, however, is provided with a slug on its core to make it slow to operate and release. This delay is necessary to permit the completion of the transmission of the Figure shift character by the transmitter distributor TD1 before starting transmission of the transmitter distributor TD2.

When relay K3 operates, it closes at contacts 19 a circuit for the clutch magnet C2 of the transmitter distributor TD2, over a circuit, —battery, switch 12, clutch magnet C2, contacts 20 of relay K2, contacts 19 of relay K3, +battery. Transmitter distributor TD2 now starts transmitting to the reperforator RP over its sending contacts 21, the characters on the number tape, namely, the serial digit or digits, Carriage Return, Line Feed and Letter Shift. Upon sensing the letter shift character, the letter shift selector mechanism in transmitter distributor TD2 momentarily opens the contacts 9′, thereby breaking the circuit of relay K2. When relay K2 releases, the circuit of clutch C2 of the transmitter distributor TD2 is opened at contacts 20 and the transmitter distributor is stopped. At the same time relay K1 is re-energized. After a slight delay, relay K3, the circuit of which is broken at contacts 18 of relay K2, falls back, and at contacts 16 again closes the circuit of the clutch magnet C1 of transmitter distributor TD1. The cycle is now repeated, but this time the next serial number in ascending order is transmitted by the transmitter distributor TD2.

A serial number tape containing the circuit designation code and ascending serial numbers is thus produced by the repreforator RP. If desired, two or more serial number tapes may be simultaneously made by connecting additional reperforators in the signal circuit.

While I have described above the principles of my invention in connection with specific apparatus, it is to be clearly understood that this description is made only by way of example and not as a limitation to the scope of my invention.

What is claimed is:

1. Apparatus for preparing a number tape of the kind described, comprising first and second automatic tape transmitter distributors, a reperforator, a control circuit, a round tape perforated with repeated groups of first code perforations each said group comprising a circuit designation code preceding a figure shift combination, an auxiliary tape perforated with repeated groups of second code perforations, each said group comprising a different serial number code followed by a letter shift combination, relay means in said control circuit responsive to the sensing of said figure shift combination in said first transmitter distributor for stopping said first transmitter distributor after the transmission of a group of said first code perforations and starting said second transmitter distributor and responsive to the sensing of said letter shift combination in said second transmitter distributor after the transmission of a group of said second code perforations for starting said first transmitter distributor and stopping said second transmitter distributor and means for applying the signal from said first and second transmitter distributors to said reperforator, whereby successive groups of code signals from each tape are applied alternately to said reperforator.

2. Apparatus as claimed in claim 1, wherein each said group of code perforations of said round tape comprises carriage return and line feed combinations preceding said circuit designations, and each said group of code perforations of said auxiliary tape comprises carriage return and line feed combinations following said serial number code.

3. Apparatus for preparing a number tape of the kind described, comprising first and second automatic tape transmitter distributors, a reperforator, a control circuit, a round tape perforated with repeated groups of code perforations each said group comprising a circuit designation code preceding a figure shift combination, an auxiliary tape perforated with repeated groups of code perforations each said group comprising a different serial number code followed by a letter shift combination, a selector extension adjacent the ends of the selector bars in said first transmitter distributor and shaped to sense both figure and letter shift combinations, contacts controlled by said extension, a selector extension adjacent the ends of the selector bars in said second transmitter distributor and shaped to sense a letter shift combination, other contacts controlled by said last-mentioned extension, relay means in said control circuit responsive to the actuation of said first-mentioned contacts for starting said second transmitter distributor and stopping said first transmitter distributor and responsive to the actuation of said other contacts for starting said first transmitter distributor and stopping said second transmitter distributor, and means for applying the signals from said first and second transmitter distributors to said reperforator.

4. Apparatus as claimed in claim 3 in which said control circuit comprises time delay means for imposing a slight delay between the stopping of said first transmitter distributor and the starting of said second transmitter distributor and between the stopping of said transmitter distributor and the starting of said first transmitter distributor.

5. Apparatus as claimed in claim 3, in which said means for starting and stopping said first and second transmitter distributors comprises first and second clutch magnets, respectively, and in which said relay means comprises first and second relays, a circuit for said first relay including said first mentioned contacts, the circuit of said second relay including said other contacts, the circuit of said first clutch magnet including contacts of said first relay and the circuit of said second clutch magnet including contacts of said second relay.

6. Apparatus as claimed in claim 5, in which the circuit of said first relay includes contacts controlled by said second relay and the circuit of said second relay includes contacts controlled by said first relay.

7. Apparatus as claimed in claim 5, in which said control circuit further comprises a slow acting third relay, the circuit of which includes contacts of said second relay, the circuit of said first clutch magnet also including break contacts of said third relay and the circuit of said second clutch magnet including make contacts of said third relay.

8. Apparatus as claimed in claim 1, in which said last mentioned means comprises an input circuit for said reperforator including in series connection the signal sending contacts of said first and second transmitter distributors.

9. The method of preparing a number tape of the kind described, which comprises preparing a round tape perforated with repeated groups of first code perforations, each said group comprising a circuit designation code preceding a figure shift combination, preparing an auxiliary tape perforated with repeated groups of second code perforations each said group comprising a different serial number followed by a letter shift combination, running said tapes respectively through first and second automatic tape transmitter distributors, utilizing said figure shift combinations on said round tape to stop said first transmitter distributor after sensing the perforations of a first group and start said second transmitter distributor, utilizing said letter shift combinations on said auxiliary tape after sensing the perforations of a second group to stop said second transmitter distributor and start said first transmitter distributor, and applying the signals from said first and second transmitter distributors to a reperforator.

References Cited in the file of this patent

UNITED STATES PATENTS

| | | |
|---|---|---|
| 2,540,029 | Hamilton et al. | Jan. 30, 1951 |
| 2,674,312 | Joel | Apr. 6, 1954 |
| 2,711,794 | Ghertman | June 28, 1955 |